(12) United States Patent
Davies

(10) Patent No.: US 8,549,724 B2
(45) Date of Patent: Oct. 8, 2013

(54) FASTENER

(75) Inventor: Brian Davies, Esperance (AU)

(73) Assignee: Brain Investments PTY Ltd., Esperance (AU)

( * ) Notice: Subject to any disclaimer, the term of this patent is extended or adjusted under 35 U.S.C. 154(b) by 1092 days.

(21) Appl. No.: 11/911,646

(22) PCT Filed: Apr. 18, 2006

(86) PCT No.: PCT/AU2006/000522
§ 371 (c)(1),
(2), (4) Date: Aug. 28, 2008

(87) PCT Pub. No.: WO2006/108245
PCT Pub. Date: Oct. 19, 2006

(65) Prior Publication Data
US 2009/0064488 A1    Mar. 12, 2009

(30) Foreign Application Priority Data

Apr. 14, 2005 (AU) ................................ 2005901861
Feb. 16, 2006 (AU) ................................ 2006900759

(51) Int. Cl.
*F16B 2/16* (2006.01)
*F16B 13/12* (2006.01)
(52) U.S. Cl.
USPC .............. 29/525.01; 29/428; 29/592; 411/15; 411/21; 411/66; 411/82; 411/348
(58) Field of Classification Search
USPC ............... 411/248, 15, 21, 22, 25, 65, 66, 82, 411/514, 348; 29/525.01, 592, 428
See application file for complete search history.

(56) References Cited

U.S. PATENT DOCUMENTS

| | | | | |
|---|---|---|---|---|
| 1,926,798 A * | 9/1933 | Baumbach | ................ | 403/374.4 |
| 2,901,804 A * | 9/1959 | Williams | ....................... | 411/348 |
| 4,453,449 A * | 6/1984 | Hollmann | .................... | 89/1.806 |
| 4,507,034 A * | 3/1985 | Lew et al. | ....................... | 411/21 |
| 5,207,544 A * | 5/1993 | Yamamoto et al. | ........... | 411/348 |
| 5,452,979 A * | 9/1995 | Cosenza | ....................... | 411/348 |

FOREIGN PATENT DOCUMENTS

| | | |
|---|---|---|
| DE | 3701074 | 7/1988 |
| EP | 0450820 | 10/1991 |
| EP | 0563542 | 10/1993 |
| EP | 120562 | 5/2002 |

(Continued)

*Primary Examiner* — Livius R Cazan
*Assistant Examiner* — Azm Parvez
(74) *Attorney, Agent, or Firm* — Blank Rome LLP

(57) ABSTRACT

A fastener for fastening at least two work pieces together comprises a body and a pin. The body has a head, a shaft extending from the head and an open hollow core extending into the shaft. The shaft has a retaining means spaced from the head to accommodate the work pieces. The retaining mechanism has a contracted configuration where it is sized to pass through holes in the work pieces and an expanded configuration where it is expanded in size or spacing such that the shaft is unable to be removed from the holes in the work pieces. The retaining mechanism defines a constriction in the core at which the core has a first width when the retaining mechanism is in its contracted configuration. The pin is locatable in the core. The pin has a least a first portion with an external width greater than the first width of the core. The pin is movable within the core and is arranged to cause the retaining mechanism to change to the expanded configuration as the first portion of the pin moves into contact with the constriction.

54 Claims, 10 Drawing Sheets

(56) References Cited

FOREIGN PATENT DOCUMENTS

| | | |
|---|---|---|
| FR | 2415225 | 8/1979 |
| GB | 2204654 | 11/1988 |
| NZ | 506394 | 10/2000 |
| WO | WO 9512762 | 5/1995 |

* cited by examiner

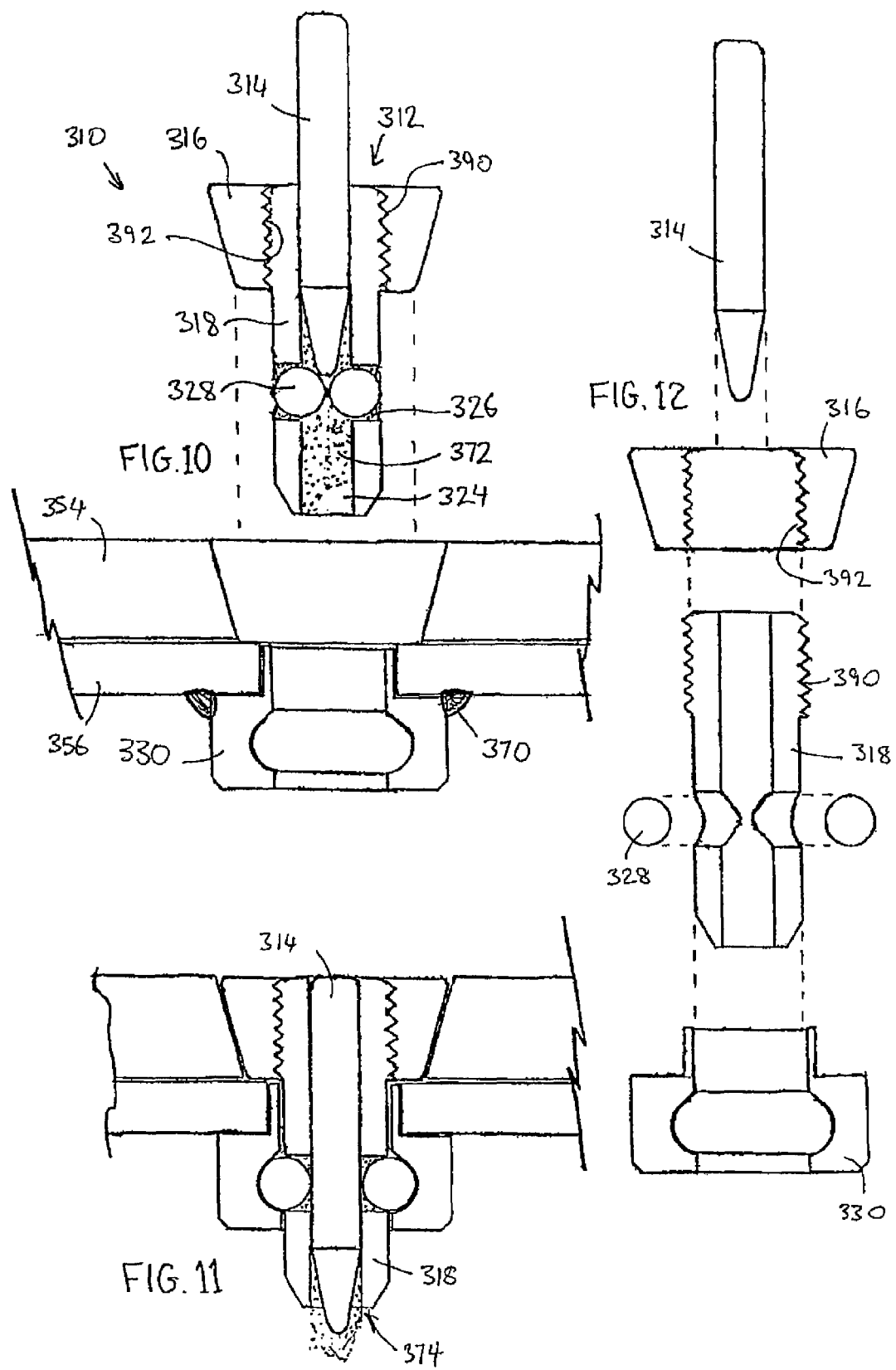

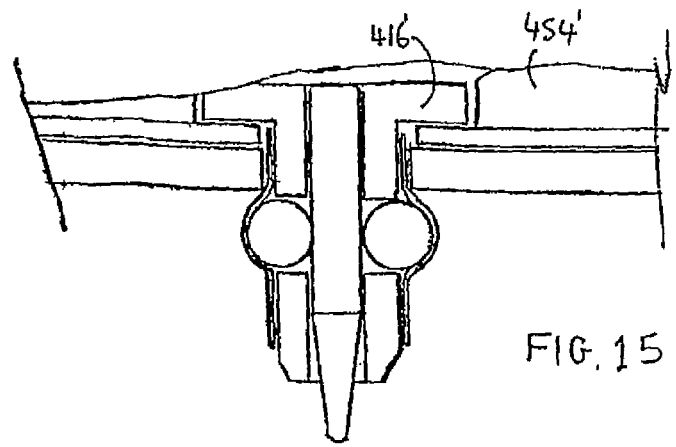
FIG. 15
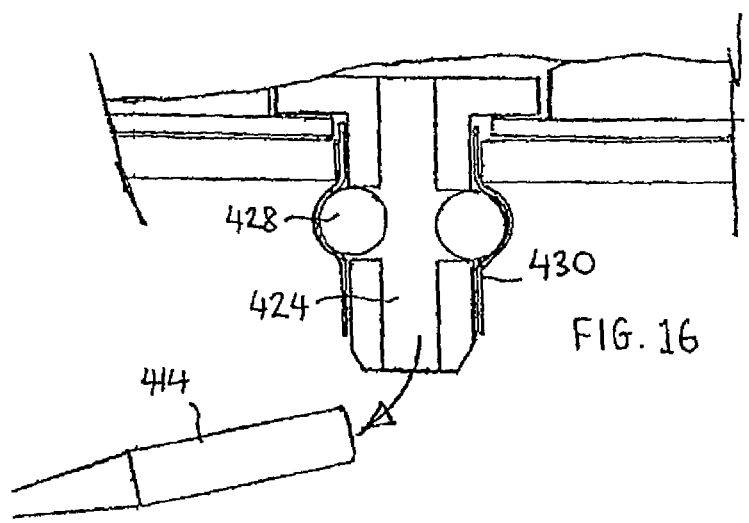
FIG. 16
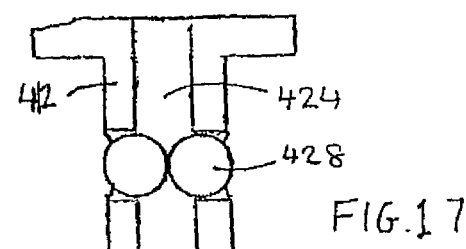
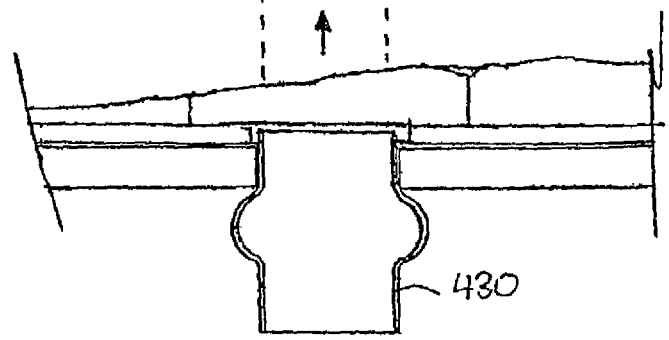
FIG. 17

FASTENER

CROSS-REFERENCE TO RELATED APPLICATION

This application claims priority under 35 U.S.C. §119 to PCT/AU2006/000522, filed Apr. 18, 2006, which claims priority to AU 2005901861 and AU 2006900759, which are hereby incorporated by reference.

FIELD OF THE INVENTION

The present invention relates to a fastener for fastening two or more work pieces together.

BACKGROUND OF THE INVENTION

Plates of hardened material, such as steel and steel alloys, are often used to minimise the effect of wear on structural elements of a piece of equipment. Often, these hardened plates are called wear plates because the material of the plate is selected for its resistance to wear. Examples of equipment which use wear plates includes hoppers, bins and chutes used in rock handling equipment and in an ore processing plant. This sort of equipment can be exposed to wear in the form of sliding and/or gouging abrasion. The wear plates act as a sacrificial element so that the plates are worn rather than the structural element of the equipment. The plates can be readily exchanged once worn, thus extending the life of the working equipment.

Typically, the wear plates are fastened to the structural elements using threaded fasteners. However, where access is limited such threaded fasteners can be difficult to use. There is a need for a non threaded fastener which can fasten two work pieces together, such as a wear plate to a structural element. It is noted that the fastener of the present invention has broader application than fastening a wear plate to a support structure.

SUMMARY OF THE INVENTION

According to a first aspect of the present invention there is provided a fastener for fastening at least two work pieces together, each work piece having a hole therein, the fastener comprising:
  a body having a head, a shaft extending from the head and an open hollow core extending into the shaft, wherein the shaft has a retaining means spaced from the head to accommodate the work pieces, wherein the retaining means has a contracted configuration where it is sized to pass through the holes in the work pieces and an expanded configuration where it is expanded in size or spacing such that the shaft is unable to be removed from the holes in the work pieces, wherein the retaining means defines a constriction in the core at which the core has a first width when the retaining means is in its contracted configuration; and
  a pin locatable in the core, the pin having a least a first portion with an external width greater than the first width of the core, wherein the pin is movable within the core and is arranged to cause the retaining means to change to the expanded configuration as the first portion of the pin moves into contact with the constriction;
  whereby, in use, the body is inserted through the holes in the work pieces such that the shaft extends through the hole in at least a second of the work pieces and then pin is subsequently driven through the core such that the first portion of the pin contacts the constriction in the core thereby causing the retaining means to expand to retain the work pieces together between the head and the expanded retaining means.

According to a second aspect of the present invention there is provided a fastener for fastening at least two work pieces together, each work piece having a hole therein, the fastener comprising:
  a body having a head, a shaft extending from the head and an open hollow core extending into the shaft, wherein the shaft has an expandable means spaced from the head to accommodate the work pieces, wherein the expandable means defines a constriction in the core at which the core has a first width when the expandable means is not expanded; and
  a pin locatable in the core, the pin having a least a first portion with an external width greater than the first width of the core, wherein the pin is movable within the core and is arranged to expand the expandable means as the first portion of the pin moves into contact with the constriction;
  whereby, in use, the body is inserted through the holes in the work pieces such that the shaft extends through the hole in at least a second of the work pieces and then pin is subsequently driven through the core such that the first portion of the pin contacts the constriction in the core thereby causing the expandable means to expand so that the shaft is unable to be removed from the holes in the work pieces thereby fixing the work pieces together between the head and the expanded expandable means.

Typically, the expanding action of the retaining/expandable means works against the second work piece to apply a force to draw the head toward the second work piece. The head applies a force to a first of the work pieces which resists the applied force, creating a clamping force between the head and the retaining/expandable means that clamps the two work pieces together.

In one embodiment the retaining means/expandable means works directly against the second work piece. In another embodiment the retaining means/expandable means works directly against the second work piece through an intermediate element.

Preferably, the pin is removable from the core. Even more preferably, the pin can be removed in the same direction as it is inserted.

Preferably, the retaining/expandable means is retractable to a state substantially the same as before it was expanded when the pin is removed from the core.

Typically the first width is smaller than a second width of an adjacent non-expandable portion of the core. Typically the external width of the pin is substantially the same as the second width of the core.

Preferably, the core extends through the length of the body.

In one embodiment, the retaining/expandable means comprises one or more balls each positioned within a tunnel extending radially from the core such that, in use, the pin forces the balls radially outward through the respective tunnels. Thus, the pin forces the balls to at least indirectly bear against a portion of the second work piece. In a preferred form of this embodiment the one or more balls project inwardly into the core to form the constriction.

In one embodiment the constriction is in the form of one or more balls which project inwardly into the core.

Preferably, the pin has a conical portion which, in use, aids the expansion of the retaining/expandable means by acting in a wedge-like manner when a larger part of the conical portion contacts the constriction in the core.

Preferably, the retaining/expandable means may further comprise an annular sleeve disposed about the shaft to retain the balls within the tunnels. Thus the sleeve is an intermediate element between the balls and the second work piece.

In one embodiment the annular sleeve is made of a ductile material such that the annular sleeve is deformed as the balls are forced out of the respective tunnels. Preferably, the sleeve is resilient.

In another embodiment the annular sleeve has a core there through with a middle portion being sized to accept the balls when they are forced radially by action of the pin, and the core on either side of the middle portion is sized to retain the expanded balls in the middle portion. Preferably the sleeve has a largest outer diameter larger than the diameter of the hole through the second work piece.

Preferably the sleeve has a smallest outer diameter smaller than the diameter of the hole through the second work pieces so that the portion having the smallest outer diameter sits at least partly within the hole of the second work piece.

In an alternative embodiment, the retaining/expandable means comprises a narrow portion of the core in which the cross section of the core narrows to define the constriction. The narrow portion is arranged such that the cross section of the core narrows toward the end of the shaft remote from the head. Thus, the wall thickness of the shaft about the narrow portion increases as the cross section narrows.

Thus, as the pin is inserted into the core and the first portion of the pin contacts the narrow portion is expanded. Typically the expansion of the narrow portion works against the second work piece to apply a force to draw the head toward the second work piece. Preferably the narrow portion is divided into a plurality of expanding fingers which move radially as the pin is driven into the constriction.

The pin may further comprise an annular recess in which a spring clip is provided, the body being arranged to allow the spring clip to pass through the core in one direction. In its relaxed state the spring clip has an outer dimension larger than of the pin. The spring clip is compressible such that the outer dimension can be reduced to be the same as that of the pin. Thus, the spring clip can be compressed as it passes through the constriction of the core.

In one embodiment the head is integrally formed on the shaft. In another embodiment the head is threadingly engaged with the shaft such that the location of the head on the shaft is adjustable. This is advantageous when the spacing between the head and the retaining/expanded means needs to be adjusted to provide snug contact and a desired clamping force between the head and the retaining/expandable means.

Preferably, the head has a frusto-conical portion. More preferably, the frusto-conical portion has a half opening angle in the range of 5° to 50°. Even more preferably, the frusto-conical portion has a half opening angle of 15°.

Preferably, the smallest outer diameter of the head is larger than the outer diameter of the shaft adjacent the head. Thus, there is a step between the head and the shaft.

In another embodiment the head is of a regular cylindrical shape having a diameter larger than the diameter of the shaft adjacent the head.

Preferably, the hole in the first work piece has a shape that complements the shape of the head such that the head can be received within the hole in the first work piece.

In one embodiment, the head is hardened to at least a Brinnell Hardeners of 350 BH.

In another embodiment the pin is removable from the shaft. Upon removal of the pin the retaining/expandable means is able to contract thereby allowing the shaft to be removed from the holes of the work pieces to remove the fastener.

According to a third aspect of the present invention, there is provided a method for fastening at least two work pieces together, each work piece having a hole therein, the method comprising the steps of:
  providing a fastener having a body having a head, a shaft extending from the head and an open hollow core extending into the shaft, wherein the shaft has an expandable means spaced from the head to accommodate the work pieces, wherein the expandable means defines a constriction in the core at which the core has a first width when the expandable means is not expanded, and a pin locatable in the core, the pin having at least a first portion with an exterior width greater than the first width of the core, wherein the pin is movable within the core and is arranged to expand the expandable means when the first portion of the pin moves into contact with the core constriction;
  aligning the work pieces such that the holes overlap;
  inserting the body through the holes such that at least the shaft has passed through the holes of all the work pieces; and
  driving the pin through the core such that the first portion of the pin contacts the constriction in the core thereby causing the expandable means to expand so that the shaft is unable to be removed from the holes in the work pieces thereby fixing the work pieces together between the head and the expanded expandable means.

Preferably, expanding the expandable means involves, at least in part, radial expansion of the expandable means.

Preferably, the pin has a conical portion such that, when driving the pin through the core, the conical portion contacts the constriction in the core which facilitates the radial movement of the expandable means.

According to a fourth aspect of the present invention there is provided a fastener for fastening at least two work pieces together, each work piece having a hole therein, the fastener comprising:
  a body having a frustoconical wear resistant head and a shaft extending from the head, the shaft having an expandable means spaced from the head to accommodate the work pieces;
  wherein the smallest outer diameter of the head is larger than the outer diameter of the shaft adjacent the head;
  whereby, in use, the body is inserted through the holes in the work pieces such that the shaft extends through the hole in at least a second of the work pieces and then the expandable means is expanded so that the shaft is unable to be removed from the holes in the work pieces thereby fixing the work pieces together between the head and the expanded expandable means.

According to a fifth aspect of the present invention there is provided a fastener for fastening at least two work pieces together, each work piece having a hole therein, the fastener comprising:
  a body having a frusto-conical hardened head and a shaft extending from the head, the shaft having an expandable means spaced from the head to accommodate the work pieces;
  wherein the smallest outer diameter of the head is larger than the outer diameter of the shaft adjacent the head;
  whereby, in use, the body is inserted through the holes in the work pieces such that the shaft extends through the hole in at least a second of the work pieces and then the expandable means is expanded so that the shaft is unable to be removed from the holes in the work piece thereby fixing the work pieces together between the head and the expanded expandable means.

According to a sixth aspect of the present invention there is provided a fastener for fastening at least two work pieces together, each work piece having a hole therein, the fastener comprising:

a body having a head, a shaft extending from the head and an open hollow core extending into the shaft, wherein the shaft has an expandable and contractible means spaced from the head to accommodate the work pieces; and a pin locatable in the core, wherein the pin is movable within the core and is arranged to expand the expandable and contractible means as the pin moves into the core;

wherein the expandable and contractible means contracts when the pin is removed from the core;

whereby, in use, the body is inserted through the holes in the work pieces such that the shaft extends through the hole in at least a second of the work pieces and then pin is subsequently inserted into the core such that the first portion of the pin contacts the constriction in the core thereby causing the expandable and contractible means to expand so that the shaft is unable to be removed from the holes in the work pieces thereby fixing the work pieces together between the head and the expanded expandable and contractible means, and when the pin is removed from the core the expandable and contractible means is caused to contract thereby enabling the shaft to be removed from the holes in the work pieces to release the fastener.

BRIEF DESCRIPTION OF THE DRAWINGS

In order that the invention may be more easily understood, embodiments will now be described, by way of example only, with reference to the accompanying drawings, in which:

FIG. 10: is a schematic cross sectional side elevation view of a fastener according to a fourth embodiment of the present invention in a first configuration;

FIG. 11: is a schematic cross sectional side elevation view of the fastener of FIG. 10 in a second configuration;

FIG. 12: is a schematic exploded cross sectional side elevation of the fastener of FIG. 10 showing individual elements of the fastener;

FIG. 15: is a schematic cross sectional side elevation view of the fastener in the configuration shown in FIG. 14 having been subject to wear;

FIG. 16: is a schematic cross sectional side elevation view of the fastener shown in FIG. 15 in a third configuration; and FIG. 17: is a schematic cross sectional side elevation view of the fastener of FIG. 15 in a fourth configuration.

DETAILED DESCRIPTION

Figure 1:
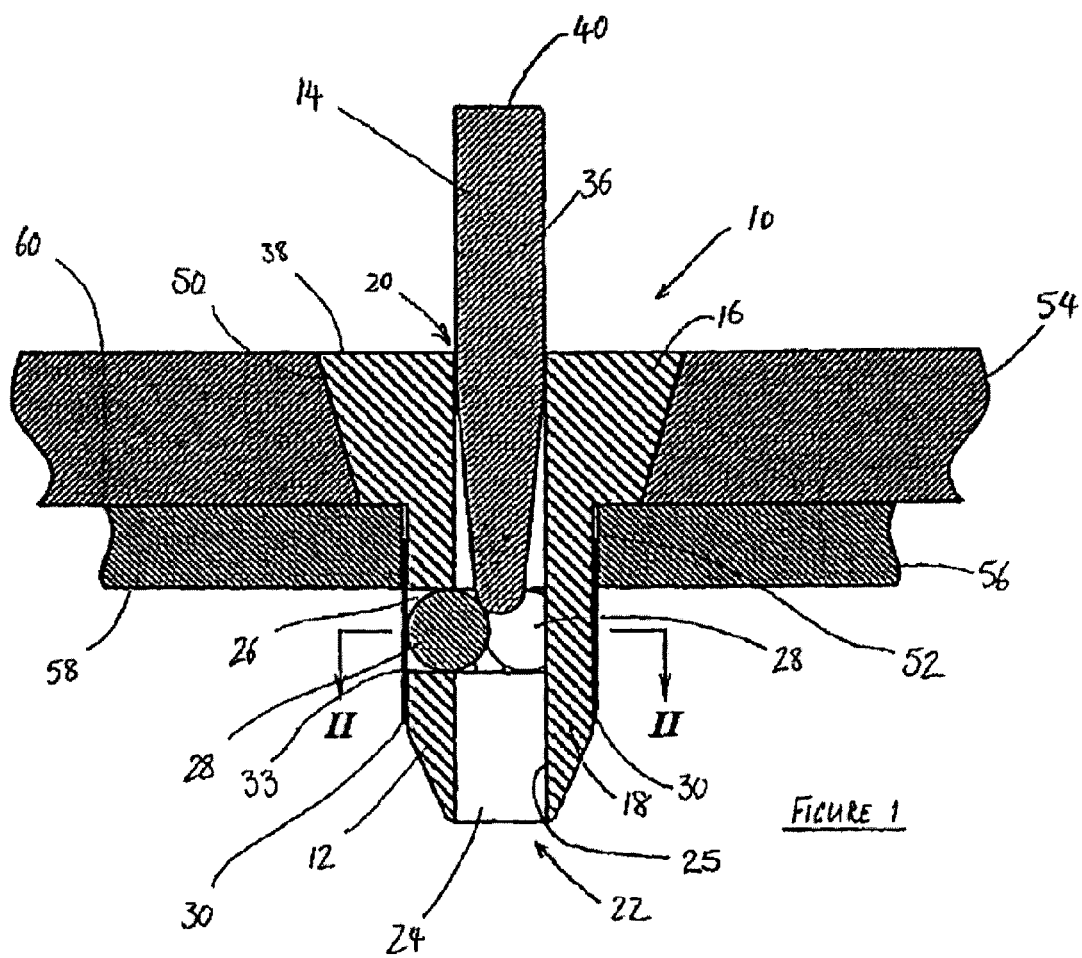
FIG. 1: is an cross sectional side elevation view of a fastener according to a first embodiment of the present invention in a first configuration.

FIGS. 1 to 5 show an elongate fastener 10 according to a first embodiment of the present invention. The fastener 10 comprises a body 12 and a pin 14. The body 12 has a head 16 from which a shaft 18 extends. The body 12 has an opening 20 in the head 16 and an opening 22 in the end of the shaft 18, such that the openings 20, 22 are provided on opposing surfaces of the body 12. A hollow core 24 defines an axial throughway between the openings 20, 22. The wall surface 25 of the core 24 is of a constant cross section along its length.

In this embodiment, the head 16 is frusto-conical in shape. The diameter of the shaft 18 is smaller than the smallest external diameter of the head 16.

The shaft 18 has three tunnels 26 which extend radially from the core 24. Each tunnel 26 is provided with a ball 28. The tunnels 26 are dimensioned such that each ball 28 can pass through the respective tunnel 26. A retaining sleeve 30 is provided which surrounds a portion of the shaft 18 such that the openings 33 of the tunnels 26 in the circumferential wall of the shaft 18 are covered. The retaining sleeve 30 is made of a ductile material (such as mild steel, aluminum, rubber or plastic) so that it is deformable. An adhesive product, such as Silastic®, is used to adhere the retaining sleeve 30 to the shaft 18.

The pin 14 has a generally conical first portion 32, which is tapered to form a small rounded end 34. A second portion 36, contiguous with the first portion, of the pin member 14 has a constant cross section such that the shape and size of the second portion 36 complements that of the core 24. The pin 14 terminates with a head 40.

FIG. 1 shows the fastener 10 employed to fasten two work pieces, such as wear plate 54 and backing plate 56, together. The body 12 of the fastener 10 is first inserted into concentric holes 50, 52 in the wear plate 54 and the backing plate 56, respectively. The head 16 is profiled such that it complements the shape of the hole 50 in the wear plate 54. The surface 38 adjacent the opening 20 is approximately flush with the wearing surface 60 of the wear plate 54.

Figure 2:
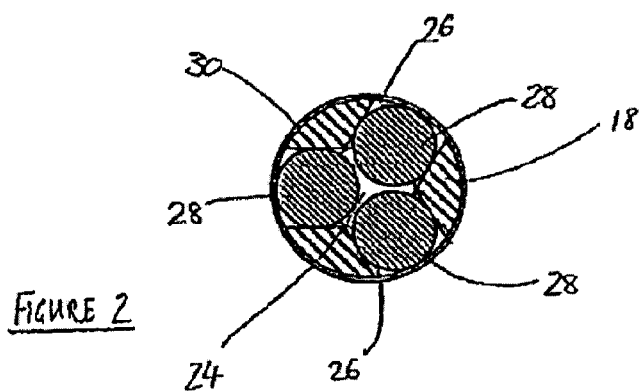
FIG. 2: is a cross section view of the fastener of FIG. 1, as viewed along the line II-II.
Figure 3:
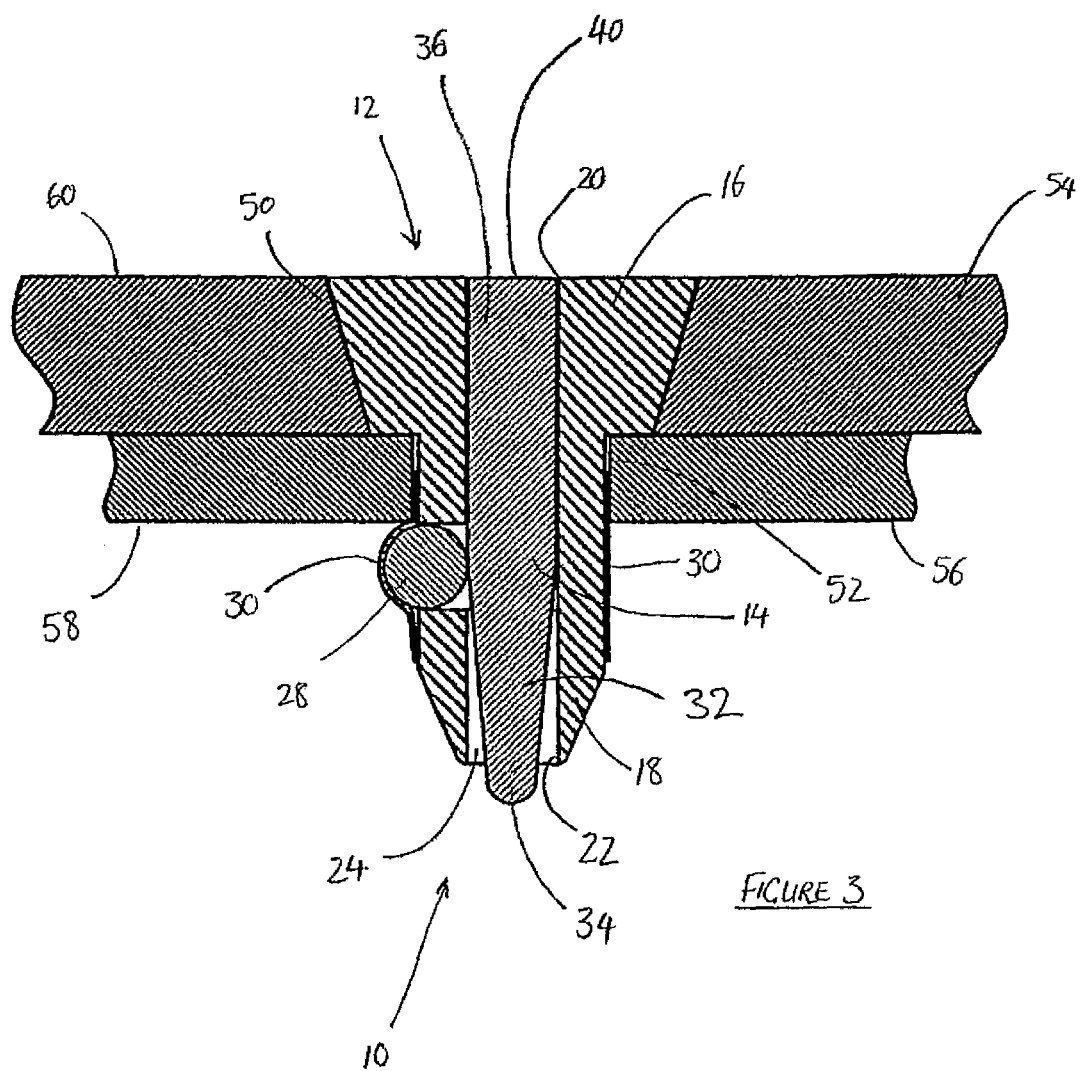
FIG. 3: is a cross sectional side elevation view of the fastener of FIG. 1 in a second configuration.

The pin 14 is inserted into the core 24 such that the conical end 34 is adjacent the balls 28, as shown in FIG. 1. The pin 14 is then driven into the core 24, for example by hammering the head 40. Initially, the balls 28 are positioned such that each ball 28 is partly in the core, as shown in FIG. 2, thereby constricting the width of the throughway of the core at that position. Due to the tapered shape of the first portion 32, the balls 28 are each pushed by the pin 14 through their respective tunnels 26. As the balls 28 move outwards, the retaining sleeve 30 is expanded at least in the regions in contact with the balls 28. The pin 14 is driven into the core 24 until the head 40 of the pin 14 is approximately flush with the wearing surface 38 of the head 16, as shown in FIG. 3.

By forcing the balls 28 radially outward through the tunnels 26, force is applied by the retaining sleeve 30 against the rear surface 58 of the backing plate 56. This force creates a wedging action, which draws the head 16 against the hole 50 in the wear plate 54. Accordingly, a compressive force is generated that fastens the wear plate 54 and backing plate 56 together.

Clearly, the position and direction of the tunnels 26 relative to the position of rear surface 58 will have an influence on the level of the compressive force generated. Ideally, the fastener 10, and thus the position of the tunnels 26 along the length of the shaft 18, will be selected according to the thickness of the backing plate 56. It will be appreciated that one or more washers may be provided about the shaft 18 and abutting the backing plate 56 in situations where the thickness of the backing plate 56 is less than is required to generate a compressive force.

In use, the head 16 and the wear plate 54 are both exposed to abrasion by material such as ore. Accordingly, both the head 16 and wear plate 54 will wear. Ultimately, the fastener 10 and the wear plate 54 need to be replaced.

Figure 4:
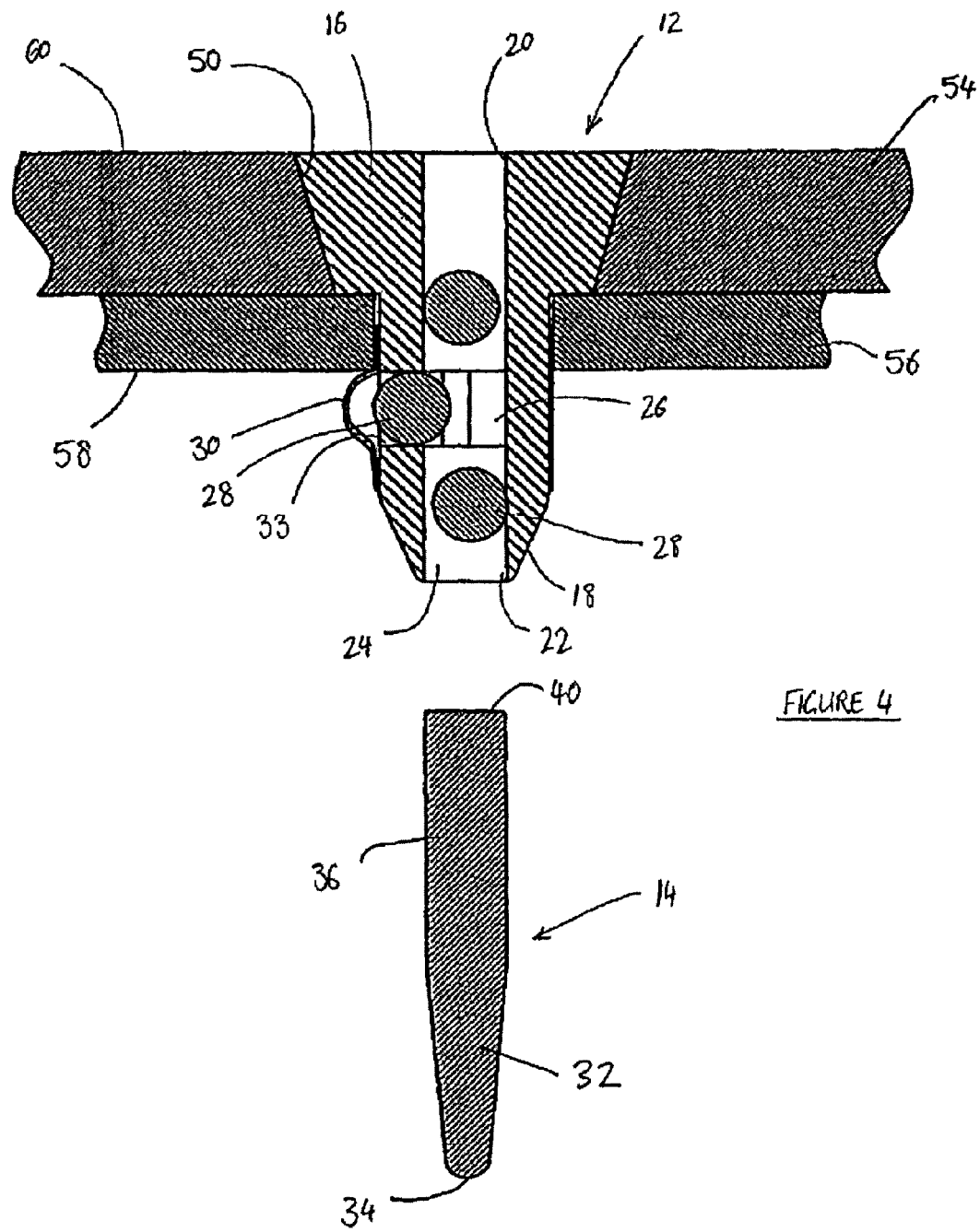
FIG. 4: is a cross sectional side elevation view of the fastener of FIG. 1 in a third configuration.
Figure 5:
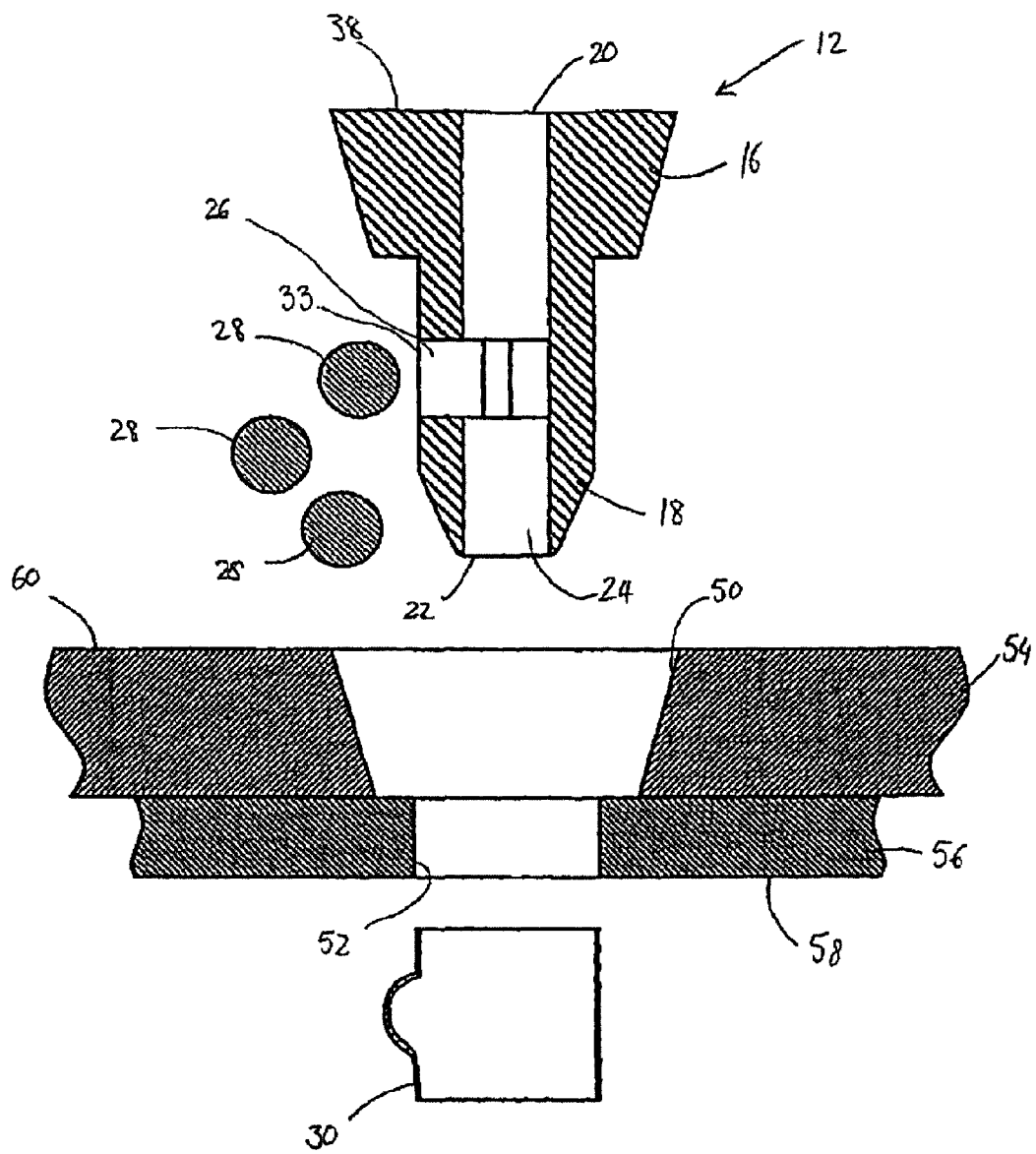
FIG. 5: is a cross sectional side elevation view of the fastener of FIG. 1 in a fourth configuration.

To release the fastener 10, the pin 14 is first extracted from the core 24, as shown in FIG. 4. The pin 14 can be extracted by driving the pin 14 out of the core 24 from the head 16, such that it exits the opening 22 in the shaft 18. The balls 28 are then released so that they can move into the core 24. As shown in FIG. 5, the retaining sleeve 30 can be removed from the shaft 18 and the body 12 withdrawn from the holes 50, 52.

The fastener 10 can be applied to, and removed from, the work pieces 54, 56 from the side of the wear surface 60 only. In other words, access to the rear side of the backing plate 56 is not required. This can be advantageous where access to the rear side of the backing plate 56 is inhibited or impossible.

The frusto-conical shape of the head 16 in this embodiment has a half opening angle of approximately 15°. However, the frusto-conical shape may have a half opening angle in the range of 5° to 50°. The hole 50 in the wear plate 54 is of complementary shape to the head 16, such that the head 16 can be received within the hole 50, as shown in the figures.

Where the fastener 10 is to be used in fastening a wear plate 54 to a backing plate 56, the head 16 of the fastener is hardened to approximately the same hardness as the wear plate 54 a Brinnell Hardness. In practice, the head 16 would be hardened to at least about a Brinnell Hardness of 350 BH.

Figure 6:
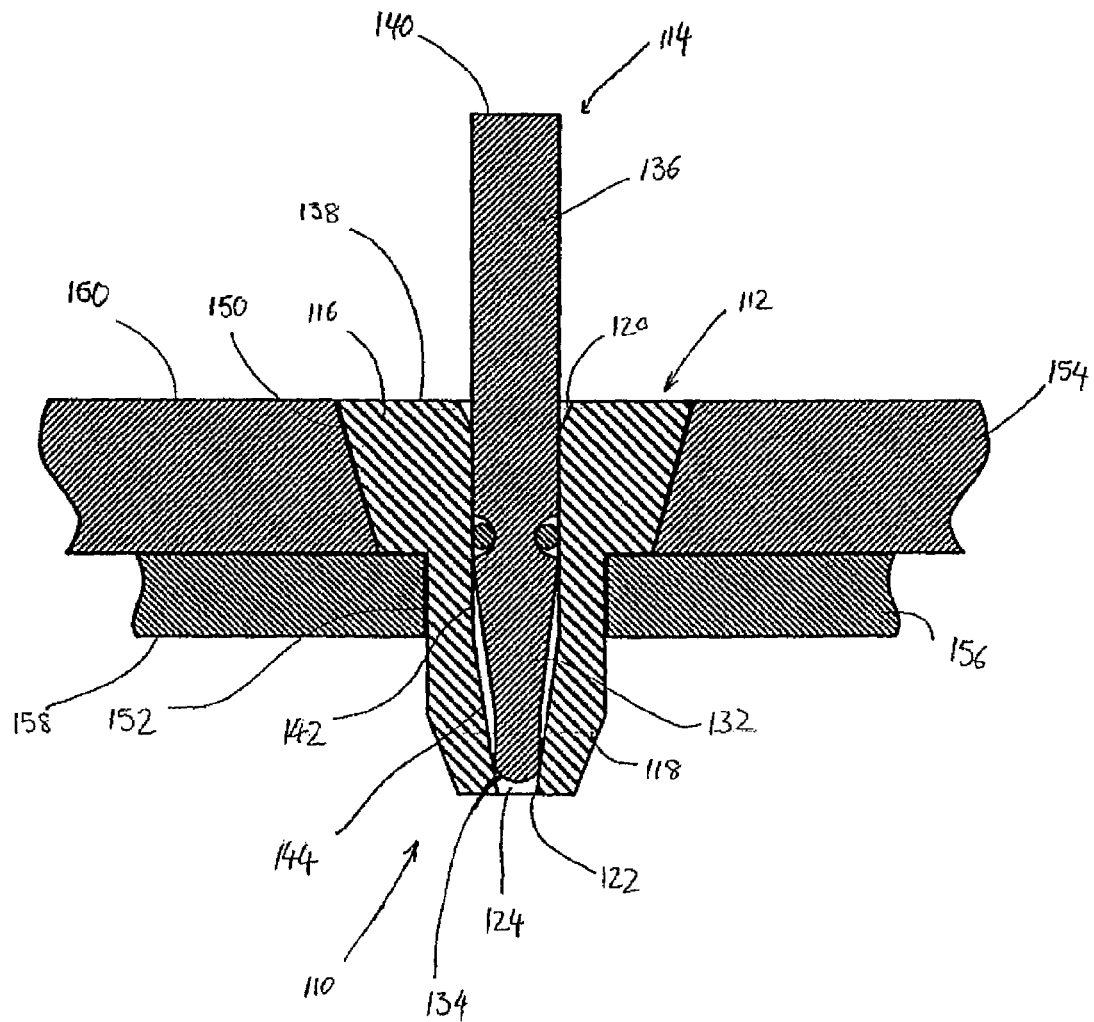
FIG. 6: is an cross sectional side elevation view of a fastener according to a second embodiment of the present invention in a first configuration.
Figure 7:
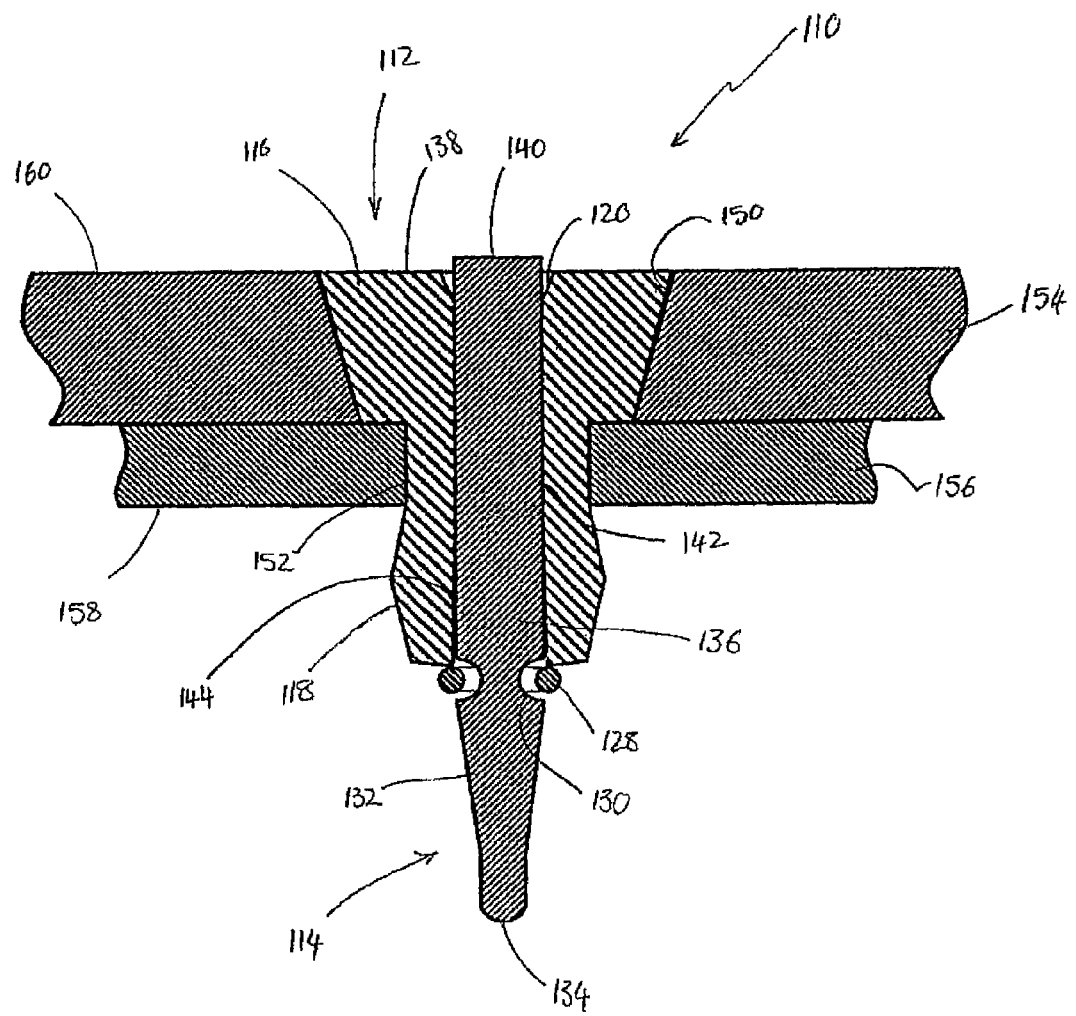
FIG. 7: is a cross sectional side elevation view of the fastener of FIG. 6 in a second configuration.

FIGS. 6 and 7 depict a fastener 110 according to a second embodiment of the present invention. The fastener 110 comprises a body 112 and a pin 114. The body 112 has a head 116 from which a shaft 118 extends. The body 112 has an opening 120 in the head 116 and an opening 122 in the end of the shaft 118, such that the openings 120, 122 are provided on opposing surfaces of the body 112. A hollow core 124 defines an axial throughway between the openings 120, 122.

The shaft 118 comprises two sections. The first section 142 has a constant wall thickness. In the first section 142, the core 124 also has a constant cross section. The second section 144 has a varied wall thickness. The wall thickness in the second section is generally increased when compared with that in the first section 142. In the second section 144, the core 124 reduces in cross section toward the opening 122 thereby creating a constriction in the core 124. The first section 142 is between, and contiguous with, the head 116 and the second section 144.

In this embodiment, the head 116 is frusto-conical in shape. The diameter of the shaft 118 is smaller than the smallest external diameter of the head 116.

The pin 114 comprises a generally conical first portion 132, which is tapered to form a small rounded end 134, and a second portion 136, which has a constant cross section. The shape and size of the second portion 136 complements that of the core 124 in the first section 142. The pin member 114 terminates with a head 140.

An annular recess 130 is provided along the length of the pin 114 within the second portion 136. Alternatively, the annular recess 130 can be provided at the interface between the first and second portions 132, 136. A spring clip 128 is received within the annular recess 130. The spring clip 128, in its relaxed state, has an outer diameter larger than the diameter of the pin member 114 in the second portion 136. However, the spring clip 128 is radially compressible such that the outer diameter can be reduced to be approximately that of the second portion 136.

As shown in FIG. 6, the narrow end 134 of the pin member 114 is to be inserted through the opening 120 into the core 124. The opening 120 has a bevelled edge such that the spring clip 128 is radially compressed as the pin member 114 is inserted into the core 124.

FIG. 6 shows the fastener 110 employed to fasten two work pieces, such as wear plate 154 and backing plate 156, together. The body 112 of the fastener 110 is first inserted into concentric holes 150, 152 in the wear plate 154 and the backing plate 156, respectively. The head 116 is profiled such that it complements the shape of the hole 150 in the wear plate 154. The surface 138 adjacent the opening 120 is approximately flush with the wearing surface 160 of the wear plate 154.

The pin 114 is inserted into the core 124 such that the pointed end 134 is within the second section 144, as shown in FIG. 5. The pin 114 is then driven into the core 124, for example by hammering the head 140. Due to the tapered shape of the first portion 132, the shaft 118 in the second section 144 is expanded as the pin 114 is driven into the core 124.

Once the spring clip 128 passes through the opening 122, the spring clip 128 will no longer be in contact with the shaft 118 and will revert to its relaxed state. In this position, the spring clip 128 is unable move into the core 124.

By expanding the second section 144 of the shaft 118, force is applied by the shaft 118 against the rear surface 158 of the backing plate 156. This force creates a wedging action, which draws the head 116 against the hole 150 in the wear plate 154. Accordingly, a compressive force is generated that fastens the wear plate 154 and backing plate 156 together.

Clearly, the location of the interface between the first and second sections 142, 144 relative to the backing plate 156, and the wall thickness of the second section 144 will influence the level of the compressive force generated. Ideally, the fastener 110 will be selected according to the thickness of the backing plate 156. It will be appreciated that one or more washers may be positioned about the shaft 118 and abutting the backing plate 156 in situations where the thickness of the backing plate 156 is less than is required to generate a compressive force.

A number of slits (not shown) may be provided to facilitate the expansion of the narrowing portion 126 during application to a work piece. The slits are aligned with the elongate axis of the shaft 118.

To remove the fastener 110, the pin 114 is extracted from the core 124. The pin 114 can be extracted by driving the pin 114 out of the core 124 from the head 116, such that it exits the opening 122 in the shaft 118. An extraction device (such as a hydraulic pin hammer) can be used to drive the pin 114 from the core 124 prior to withdrawing the body 112. Subsequently, the body 112 can be removed from the holes 150, 152. Alternatively, the exposed part of the shaft 118, including the pin 114, can be cut leaving a remaining part of the fastener 110, which can readily be removed from the work piece.

Figure 8:
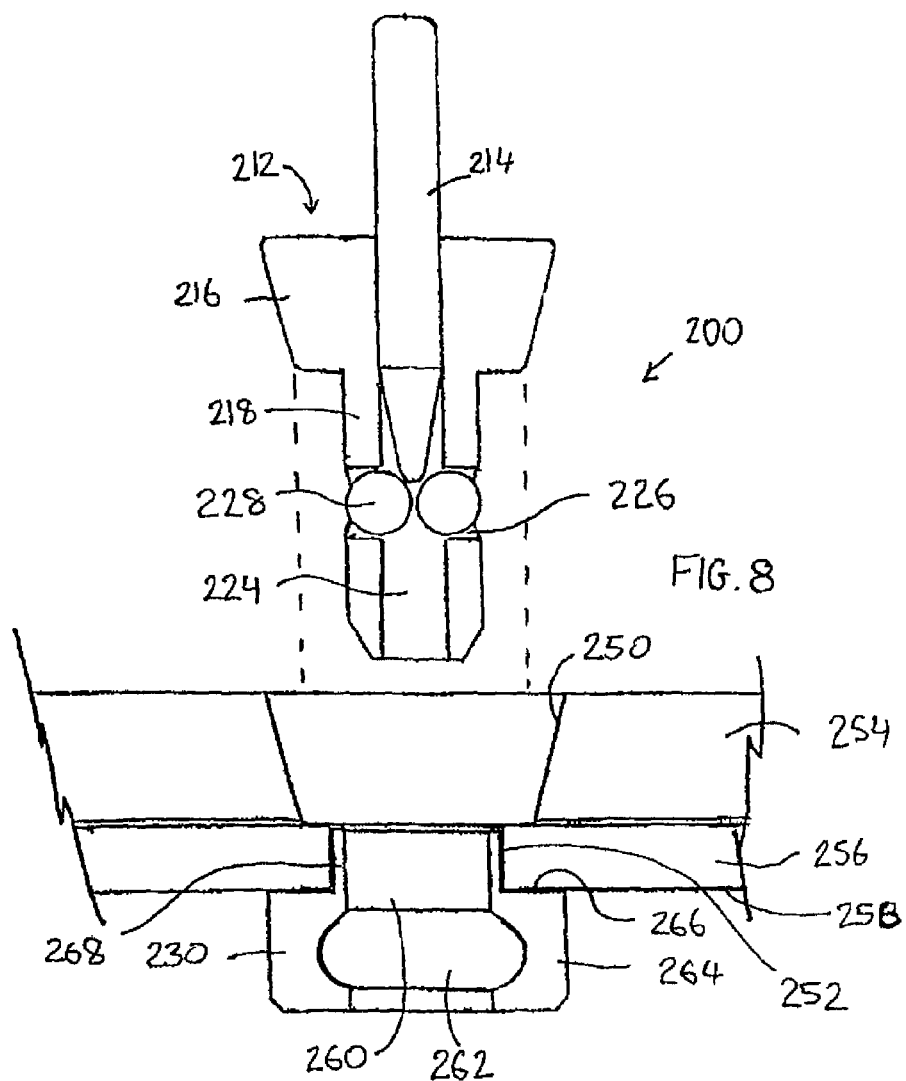
FIG. 8: is a schematic cross sectional side elevation view of a fastener according to a third embodiment of the present invention in a first configuration.
Figure 9:
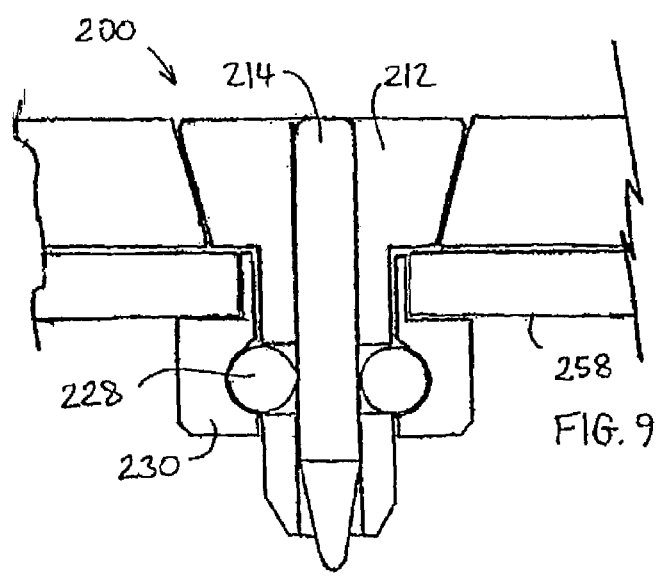
FIG. 9: is a schematic cross sectional side elevation view of the fastener of FIG. 8 in a second configuration.
Figure 13:
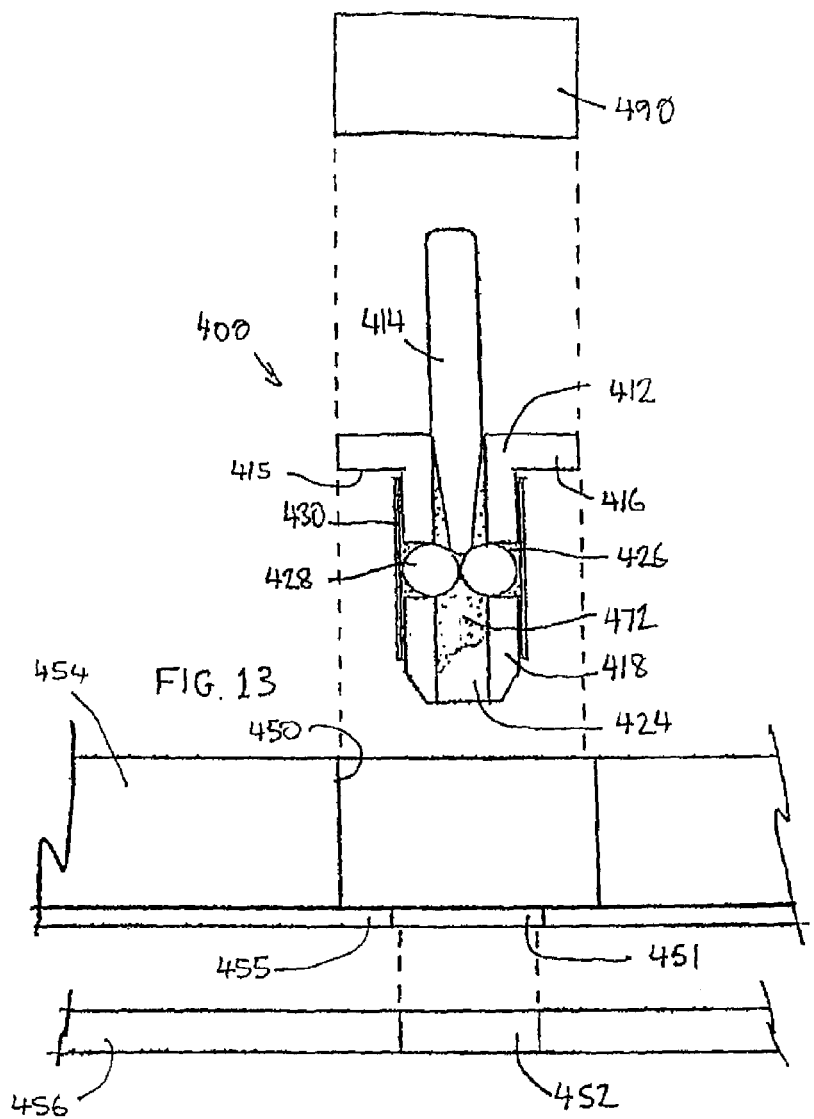
FIG. 13: is a schematic cross sectional side elevation view of a fastener according to a fifth embodiment of the present invention in a first configuration.

FIGS. 8 and 9 show an elongated fastener 200 according to a third embodiment of the present invention. This embodiment is similar to the first embodiment with the main differences being in the number of tunnels and balls and the retaining sleeve as described below. The fastener 200 comprises a body 212 and a pin 214. The body 212 has a head 216 from which extends a shaft 218. A hollow core 224 extends from an opening in the head 216 at one end of the body 212 to an opening in the shaft 218 at the other end of the body 212. In this embodiment the shaft has two tunnels 226, which extend radially from the core 224 in opposite directions. Each tunnel 226 is provided with a ball 228. The tunnels 226 have dimensions such that each ball 228 can pass through the respective tunnel 226.

A retaining sleeve 230 is also provided. The retaining sleeve 230 has a through hole 260 extending axially through the sleeve 230. Through hole 260 has a radially extending channel 262 within a retaining portion 264 of the sleeve 230, which is coaxially aligned with the tunnels 226. The channel 262 is dimensioned to receive the respective balls 228 into either end of the channel 226 as the pin 214 is driven into the body 212 and as shown in FIG. 9. The through hole 260 is sized to receive the shaft 218.

An end portion 268 of the sleeve 230 is smaller in size than the retaining portion 264. The retaining portion 262 is sized to be larger than the size of the hole 252 through the second work piece. The size of the end portion 268 is approximately the same size as the size of the hole 262 so that it can fit within the hole 252.

The manner of use of this embodiment is similar to the previous embodiment. The fastener 200 is inserted through aligned holes 250 and 252 in the work pieces 254 and 256 so that the head 216 is substantially located within the hole 250. The end portion 268 of the sleeve 260 fits within the hole 252. Surface 266 of the retaining portion 264 abuts surface 258 of the second work piece 256. The shaft 218 passes through the through hole 260 such that an end portion projects past the retaining portion 264 as shown in FIG. 9. The pin 214 is then driven into the body 214 which in turn forces the balls 228 to expand radially thereby partly leaving the tunnels 226 and partly entering the channel 262. The positioning of the balls (as shown in FIG. 9) thus provides a mechanical bar to the sleeve 230 from being removed from the hole 252 and also provides a bar to the body 212 also from being removed from the hole 250 thereby fixing the two work pieces together. As in the previous embodiment, due to the tapered shape of the channel 262 and the shape of the balls, a wedging action may additionally draw the head 216 against the hole 250 and likewise the surface 266 will be drawn hard up against the surface 258 of the second work piece, thereby providing a compressive force between the work pieces, thus clamping the work pieces together.

FIGS. 10-12 show a fourth embodiment of the present invention. This embodiment is similar to the previous third embodiment, with the main differences relating to the head. In this embodiment it can be seen that head 316 is provided with an internal thread 392 and shaft 318 is provided with an external thread 390 thus the head 316 threadingly engages the shaft 318. This arrangement allows for adjustment and the relative positioning of the head 316 in relation to the shaft 318. Adjustment in this way is useful so that upon driving the pin into the body 312 the desired amount of clamping force is provided. If the head 316 is wound too far onto the shaft 318, too much clamping force may be provided or the balls 328 may be incorrectly positioned within the sleeve 330. If the head 316 is not wound enough onto the shaft, insufficient or no clamping force may be provided. Where no clamping force is provided, the head 316 may not properly nest within the hole 250. This will allow axial movement of the fastener 310 relative to the work pieces 354 and 356 which may allow movement of the work pieces relative to one another. However they will still be loosely fixed together. In this embodiment the sleeve 330 is shown welded by weld spots 370 to the second work piece 356. Additionally in this embodiment a sealant such as a corrosion resistant silicone product 372 may be provided within the core 224 and tunnels 326. The sealant 372 will keep the balls 328 in place prior to use of the fastener. The sealant will be ejected from the opening 374 when the pin 314 is driven into the body 312 as shown in FIG. 11.

Figure 14:
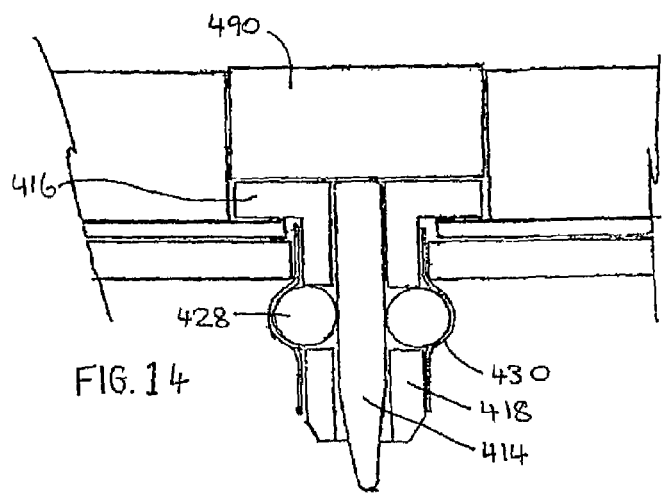
FIG. 14: is a schematic cross sectional side elevation view of the fastener of FIG. 13 in a second configuration.

Referring to FIGS. 13 to 17, a fifth embodiment of the present invention is shown. This embodiment is similar to the first embodiment of FIGS. 1 to 5 with the main difference being the shape of the head. This fastener 400 includes a body 412 and a pin 414. The body 412 has a head 416 and a shaft 418 extending from the head 416. A hollow core 424 extends through the body 412. Radially extending tunnels 426 receive balls 428 and allow the balls 428 to expand radially when pin 414 is driven into the core 424. Sealing compound 472 prevents corrosion and holds the balls 428 in place. Surrounding the shaft 418 is a cylindrical sleeve 430 similar to the sleeve 30 of the first embodiment. The head 416 is a regular cylindrically shaped annulus of larger diameter than the diameter of the shaft 418. In use the fastener 400 is inserted through a hole 450 in the first work piece 454 such that head 416 is sized to be approximately the diameter of the hole 450. The first work piece 454 has a second through hole 451 of narrower diameter than the hole 450 thereby providing a shoulder 455 on which the under side 415 of the head 416 abuts. The diameter of the head 416 is larger than the diameter of the hole 451. The diameter of the hole 451 is approximately the same diameter as the diameter of hole 452 through the second work piece 456. The diameter of the shaft 418 and the diameter of the sleeve 430 are less than the holes 451 and 452 so that the shaft 418 and sleeve 430 can pass there through as shown in FIG. 14.

In this embodiment the fastener 400 is adapted to accept a plug 490 on top of the head 416 to fill the remainder of a hole 450 so that the upper surface of the plug 490 is substantially level with the rest of the upper surface of the first work piece 454. An example of the first work piece in this situation is a wear plate formed of rubber material. This type of wear plate is used where resilience of a wear plate is more important than hardness of the wear plate so that material impacting on the wall of the wear plate tends to bounce off.

Where the fastener 400 such as that shown in FIG. 15 is to be replaced, where, for example, the wear plate 454' has worn to a replacement level (and possibly the head 416' of the fastener as well), the pin 414 is driven through the core 424 so that it is removed. The balls 428 can then travel through the tunnels 426 and re-enter the core 424. This is assisted if the sleeve 430 is resilient. Once the balls have re-entered the core 424 as shown in FIG. 17, the body 412 can then be removed. Additionally, the sleeve 430 can be removed. The work pieces are then unfastened so that for example the first work piece 454' can be replaced.

It will be understood to persons skilled in the art of the invention that many modifications may be made without departing from the scope of the invention. For example, the head may be a conical frustum of elliptic or pyramid in shape. In a further alternative form, the head may be prismatic body, such as a cylinder. The hole in the first work piece (the wear plate 54 in FIGS. 1 to 5) would need to be provided with a shoulder against which the head 16 can abut in use.

Throughout this specification, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

The claims defining the invention are as follows:

1. A fastener comprising:
   a body having a head, a shaft extending from the head and provided with a hollow core, and a retaining mechanism having an expanded state where the shaft is unable to be removed from a hole into which the shaft is inserted, and a contracted state where the shaft is able to pass through the hole, the retaining mechanism comprising one or more balls and respective tunnels formed radially in the shaft wherein the balls are able to move within respective tunnels, the body provided with a first opening in the head leading to the hollow core;
   a pin having a constant diameter portion and a contiguous tapered portion reducing in outer diameter to, and forming, a leading end of the pin, the pin being locatable in the core and being insertable into the body from the first opening and axially movable within the hollow core in a first direction toward an end of the body distant the head wherein the leading end of the pin abuts and moves the balls radially outward to a position where the balls are located partly outside their respective tunnels to place the retaining mechanism in the expanded state; and
   a sleeve locatable about the shaft at a position to cover the tunnels to retain the balls between the pin and the sleeve partly within and partly outside of their respective tunnels when the pin is moved to place the retaining mechanism in the expanded state,
   wherein the sleeve has an un-deformed state where the sleeve is passed into the hole with the shaft of the fastener and retains the balls within the shaft to lie partly in the hollow core; and an expanded state where the sleeve is expanded radially outwards when the pin is moved to place the retaining mechanism in the expanded state.

2. A fastener according to claim 1, wherein a portion of the sleeve can extend into the hole.

3. A fastener according to claim 1, wherein the sleeve is attached to the shaft by an adhesive.

4. A fastener according to claim 1, wherein the expanding action of the retaining mechanism creates a force to draw the head toward the hole.

5. A fastener according to claim 4, wherein the created force is a clamping force between the head and the sleeve.

6. A fastener according to claim 1, wherein the pin is removable from the core and wherein the retaining mechanism can revert to the contracted state when the pin is removed from the core.

7. A fastener according to claim 1, wherein the body comprises a second opening located at an end of the shaft distant the head and forming an opening of the hollow core at the end of the shaft wherein the pin is removable from the core by driving the pin in the first direction out of the core.

8. A fastener according to claim 1, wherein the head is frusto-conically shaped and wear-resistant, wherein a smallest outer diameter of the head is larger than the outer diameter of the shaft adjacent the head.

9. A fastener according to claim 1, wherein the head is threadingly engaged with the shaft such that the position of the head relative to the shaft is adjustable.

10. A fastener according to claim 9, wherein the position of the head relative to the shaft can be fixed prior to use, such that the relative position of the head is no longer adjustable.

11. A fastener according to claim 1, wherein the pin is movable within the hollow core in the first direction to a location where the pin passes the retaining mechanism and wherein the retaining mechanism can revert to the contracted state.

12. A fastener comprising:
    a body having a head, a shaft extending from the head and provided with a hollow core, and a retaining mechanism having an expanded state where the shaft is unable to be removed from a hole into which the shaft is inserted, and a contracted state where the shaft is able to pass through the hole, the retaining mechanism comprising one or more balls and respective tunnels formed radially in the shaft wherein the balls are able to move within respective tunnels, the body provided with a first opening in the head leading to the hollow core;
    a pin having a constant diameter portion and a contiguous tapered portion reducing in outer diameter to, and forming, a leading end of the pin, the pin being locatable in the core and being insertable into the body from the first opening and axially movable within the hollow core in a first direction toward an end of the body distant the head wherein the leading end of the pin abuts and moves the balls radially outward to a position where the balls are located partly outside their respective tunnels to place the retaining mechanism in the expanded state; and
    a sleeve locatable about the shaft at a position to cover the tunnels to retain the balls between the pin and the sleeve partly within and partly outside of their respective tunnels when the pin is moved to place the retaining mechanism in the expanded state,
    wherein a portion of the sleeve can extend into the hole.

13. A fastener according to claim 12, wherein the sleeve is attached to the shaft by an adhesive.

14. A fastener according to claim 12, wherein the sleeve comprises: an inner and an outer circumferential surface, the inner circumferential surface defining an axially extending hole; and a channel formed in the inner circumferential surface and extending radially toward the outer circumferential surface, wherein the channel partly accommodates the balls when the retaining mechanism is in the expanded state.

15. A fastener according to claim 12, wherein the expanding action of the retaining mechanism creates a force to draw the head toward the hole.

16. A fastener according to claim 15, wherein the created force is a clamping force between the head and the sleeve.

17. A fastener according to claim 12, wherein the pin is removable from the core and wherein the retaining mechanism can revert to the contracted state when the pin is removed from the core.

18. A fastener according to claim 12, wherein the body comprises a second opening located at an end of the shaft distant the head and forming an opening of the hollow core at the end of the shaft wherein the pin is removable from the core by driving the pin in the first direction out of the core.

19. A fastener according to claim 12, wherein the head is frusto-conically shaped and wear-resistant, wherein a smallest outer diameter of the head is larger than the outer diameter of the shaft adjacent the head.

20. A fastener according to claim 12, wherein the head is threadingly engaged with the shaft such that the position of the head relative to the shaft is adjustable.

21. A fastener according to claim 20, wherein the position of the head relative to the shaft can be fixed prior to use, such that the relative position of the head is no longer adjustable.

22. A fastener according to claim 12, wherein the pin is movable within the hollow core in the first direction to a location where the pin passes the retaining mechanism and wherein the retaining mechanism can revert to the contracted state.

23. A fastener comprising:
a body having a head, a shaft extending from the head and provided with a hollow core, and a retaining mechanism having an expanded state where the shaft is unable to be removed from a hole into which the shaft is inserted, and a contracted state where the shaft is able to pass through the hole, the retaining mechanism comprising one or more balls and respective tunnels formed radially in the shaft wherein the balls are able to move within respective tunnels, the body provided with a first opening in the head leading to the hollow core;
a pin having a constant diameter portion and a contiguous tapered portion reducing in outer diameter to, and forming, a leading end of the pin, the pin being locatable in the core and being insertable into the body from the first opening and axially movable within the hollow core in a first direction toward an end of the body distant the head wherein the leading end of the pin abuts and moves the balls radially outward to a position where the balls are located partly outside their respective tunnels to place the retaining mechanism in the expanded state; and
a sleeve locatable about the shaft at a position to cover the tunnels to retain the balls between the pin and the sleeve partly within and partly outside of their respective tunnels when the pin is moved to place the retaining mechanism in the expanded state,
wherein the sleeve is attached to the shaft by an adhesive.

24. A fastener according to claim 23, wherein a portion of the sleeve can extend into the hole.

25. A fastener according to claim 23, wherein the expanding action of the retaining mechanism creates a force to draw the head toward the hole.

26. A fastener according to claim 25, wherein the created force is a clamping force between the head and the sleeve.

27. A fastener according to claim 23, wherein the pin is removable from the core and wherein the retaining mechanism can revert to the contracted state when the pin is removed from the core.

28. A fastener according to claim 23, wherein the body comprises a second opening located at an end of the shaft distant the head and forming an opening of the hollow core at the end of the shaft wherein the pin is removable from the core by driving the pin in the first direction out of the core.

29. A fastener according to claim 23, wherein the head is frusto-conically shaped and wear-resistant, wherein a smallest outer diameter of the head is larger than the outer diameter of the shaft adjacent the head.

30. A fastener according to claim 23, wherein the head is threadingly engaged with the shaft such that the position of the head relative to the shaft is adjustable.

31. A fastener according to claim 30, wherein the position of the head relative to the shaft can be fixed prior to use, such that the relative position of the head is no longer adjustable.

32. A fastener according to claim 23, wherein the pin is movable within the hollow core in the first direction to a location where the pin passes the retaining mechanism and wherein the retaining mechanism can revert to the contracted state.

33. A fastener comprising:
a body having a head, a shaft extending from the head and provided with a hollow core, and a retaining mechanism having an expanded state where the shaft is unable to be removed from a hole into which the shaft is inserted, and a contracted state where the shaft is able to pass through the hole, the retaining mechanism comprising one or more balls and respective tunnels formed radially in the shaft wherein the balls are able to move within respective tunnels, the body provided with a first opening in the head leading to the hollow core;
a pin having a constant diameter portion and a contiguous tapered portion reducing in outer diameter to, and forming, a leading end of the pin, the pin being locatable in the core and being insertable into the body from the first opening and axially movable within the hollow core in a first direction toward an end of the body distant the head wherein the leading end of the pin abuts and moves the balls radially outward to a position where the balls are located partly outside their respective tunnels to place the retaining mechanism in the expanded state; and
a sleeve locatable about the shaft at a position to cover the tunnels to retain the balls between the pin and the sleeve partly within and partly outside of their respective tunnels when the pin is moved to place the retaining mechanism in the expanded state,
wherein the body comprises a second opening located at an end of the shaft distant the head and forming an opening of the hollow core at the end of the shaft wherein the pin is removable from the core by driving the pin in the first direction out of the core.

34. A fastener according to claim 33, wherein a portion of the sleeve can extend into the hole.

35. A fastener according to claim 33, wherein the sleeve is attached to the shaft by an adhesive.

36. A fastener according to claim 33, wherein the sleeve comprises: an inner and an outer circumferential surface, the inner circumferential surface defining an axially extending hole; and a channel formed in the inner circumferential surface and extending radially toward the outer circumferential surface, wherein the channel partly accommodates the balls when the retaining mechanism is in the expanded state.

37. A fastener according to claim 33, wherein the expanding action of the retaining mechanism creates a force to draw the head toward the hole.

38. A fastener according to claim 37, wherein the created force is a clamping force between the head and the sleeve.

39. A fastener according to claim 33, wherein the pin is removable from the core and wherein the retaining mechanism can revert to the contracted state when the pin is removed from the core.

40. A fastener according to claim 33, wherein the head is frusto-conically shaped and wear-resistant, wherein a smallest outer diameter of the head is larger than the outer diameter of the shaft adjacent the head.

41. A fastener according to claim 33, wherein the head is threadingly engaged with the shaft such that the position of the head relative to the shaft is adjustable.

42. A fastener according to claim 41, wherein the position of the head relative to the shaft can be fixed prior to use, such that the relative position of the head is no longer adjustable.

43. A fastener according to claim 33, wherein the pin is movable within the hollow core in the first direction to a location where the pin passes the retaining mechanism and wherein the retaining mechanism can revert to the contracted state.

44. A fastener comprising:
a body having a head, a shaft extending from the head and provided with a hollow core, and a retaining mechanism having an expanded state where the shaft is unable to be removed from a hole into which the shaft is inserted, and a contracted state where the shaft is able to pass through the hole, the retaining mechanism comprising one or more balls and respective tunnels formed radially in the shaft wherein the balls are able to move within respective tunnels, the body provided with a first opening in the head leading to the hollow core;
a pin having a constant diameter portion and a contiguous tapered portion reducing in outer diameter to, and forming, a leading end of the pin, the pin being locatable in the core and being insertable into the body from the first opening and axially movable within the hollow core in a first direction toward an end of the body distant the head wherein the leading end of the pin abuts and moves the balls radially outward to a position where the balls are located partly outside their respective tunnels to place the retaining mechanism in the expanded state; and
a sleeve locatable about the shaft at a position to cover the tunnels to retain the balls between the pin and the sleeve partly within and partly outside of their respective tunnels when the pin is moved to place the retaining mechanism in the expanded state,
wherein the head is threadingly engaged with the shaft such that the position of the head relative to the shaft is adjustable.

45. A fastener according to claim 44, wherein a portion of the sleeve can extend into the hole.

46. A fastener according to claim 44, wherein the sleeve is attached to the shaft by an adhesive.

47. A fastener according to claim 44, wherein the sleeve comprises: an inner and an outer circumferential surface, the inner circumferential surface defining an axially extending hole; and a channel formed in the inner circumferential surface and extending radially toward the outer circumferential surface, wherein the channel partly accommodates the balls when the retaining mechanism is in the expanded state.

48. A fastener according to claim 44, wherein the expanding action of the retaining mechanism creates a force to draw the head toward the hole.

49. A fastener according to claim 48, wherein the created force is a clamping force between the head and the sleeve.

50. A fastener according to claim 44, wherein the pin is removable from the core and wherein the retaining mechanism can revert to the contracted state when the pin is removed from the core.

51. A fastener according to claim 44, wherein the body comprises a second opening located at an end of the shaft distant the head and forming an opening of the hollow core at the end of the shaft wherein the pin is removable from the core by driving the pin in the first direction out of the core.

52. A fastener according to claim 44, wherein the head is frusto-conically shaped and wear-resistant, wherein a smallest outer diameter of the head is larger than the outer diameter of the shaft adjacent the head.

53. A fastener according to claim 44, wherein the position of the head relative to the shaft can be fixed prior to use, such that the relative position of the head is no longer adjustable.

54. A fastener according to claim 44, wherein the pin is movable within the hollow core in the first direction to a location where the pin passes the retaining mechanism and wherein the retaining mechanism can revert to the contracted state.

\* \* \* \* \*

UNITED STATES PATENT AND TRADEMARK OFFICE
CERTIFICATE OF CORRECTION

PATENT NO. : 8,549,724 B2  
APPLICATION NO. : 11/911646  
DATED : October 8, 2013  
INVENTOR(S) : Brian Davies Page 1 of 1

It is certified that error appears in the above-identified patent and that said Letters Patent is hereby corrected as shown below:

Title Page: Item (73)

Under the heading Assignee:

Please correct the spelling of the Assignee's name from "Brain Investments PTY Ltd." to --Brian Investments PTY Ltd.--.

Signed and Sealed this  
Twenty-eighth Day of January, 2014

Michelle K. Lee  
*Deputy Director of the United States Patent and Trademark Office*